United States Patent [19]

Yamaguchi

[11] Patent Number: 4,906,061
[45] Date of Patent: Mar. 6, 1990

[54] COLLIMATED LIGHT BEAM SCANNING METHOD INCLUDING CURVATURE OF FIELD CORRECTION

[75] Inventor: Katsumi Yamaguchi, Fuchu, Japan
[73] Assignee: Ricoh Company, Ltd., Tokyo, Japan
[21] Appl. No.: 210,794
[22] Filed: Jun. 24, 1988

[30] Foreign Application Priority Data

Jun. 26, 1987 [JP] Japan ................................. 62-158865
Aug. 28, 1987 [JP] Japan ................................. 62-216193
Jun. 21, 1988 [JP] Japan ................................. 63-152819

[51] Int. Cl.⁴ ........................ G02B 26/10; G02B 26/08
[52] U.S. Cl. ...................................... 350/6.3; 350/486
[58] Field of Search ................... 350/6.1, 6.2, 6.3, 6.5, 350/6.6, 6.7, 6.8, 320, 486

[56] References Cited

U.S. PATENT DOCUMENTS 3,720,454  3/1973  Inderhees ............................ 350/486
4,707,126  3/1971  Ohshima et al. ..................... 355/218
4,744,071  5/1988  Bricot et al. ........................ 350/486

Primary Examiner—Bruce Y. Arnold
Assistant Examiner—Ronald M. Kachmarik
Attorney, Agent, or Firm—Oblon, Spivak, McClelland, Maier & Neustadt

[57] ABSTRACT

A laser beam from a laser beam source is applied via a collimator lens to a rotating light deflector, deflected by the light deflector, and applied via an fθ lens to a surface to scan the same.

The fθ lens comprises a single-element lens with its fθ characteristics well corrected.

To correct the curvature of field by the fθ lens, the collimator lens is vibrated in simple harmonic motion along the optical axis thereof, or the laser beam source is vibrated in simple harmonic motion along the optical axis of the collimator lens, in synchronism with the scanning of the surface with the laser beam.

4 Claims, 17 Drawing Sheets

F I G. 3 (A)
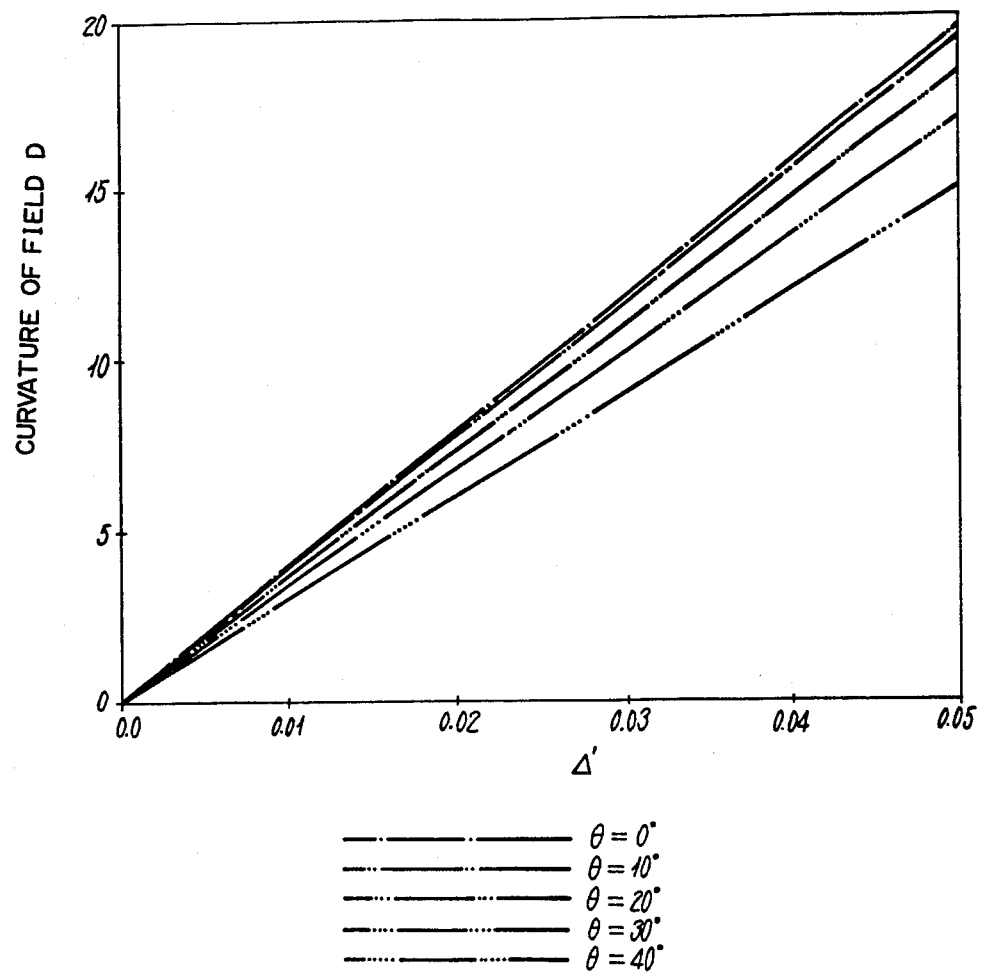

fθ CHARACTERISTICS

------ MERIDIONAL
——— SAGITTAL

CURVATURE OF FIELD PRIOR TO CORRECTION

CURVATURE OF FIELD AFTER CORRECTION (E=0.5)

CURVATURE OF FIELD AFTER CORRECTION (E=0.7)

fθ CHARACTERISTICS

-------- MERIDIONAL
———— SAGITTAL

CURVATURE OF FIELD PRIOR TO CORRECTION

CURVATURE OF FIELD AFTER CORRECTION (E=0.5)

CURVATURE OF FIELD AFTER CORRECTION (E=0.7)

F I G. 15
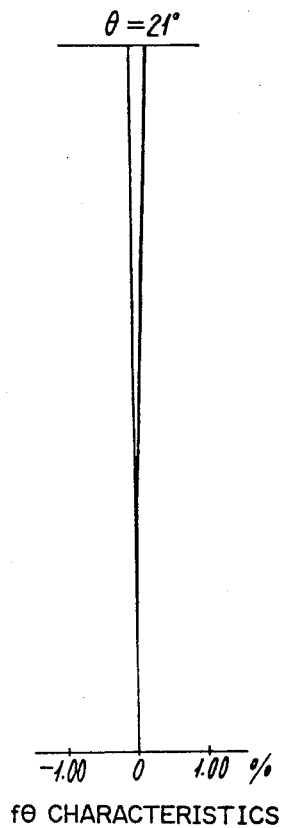
fθ CHARACTERISTICS
F I G. 16
------ MERIDIONAL
——— SAGITTAL
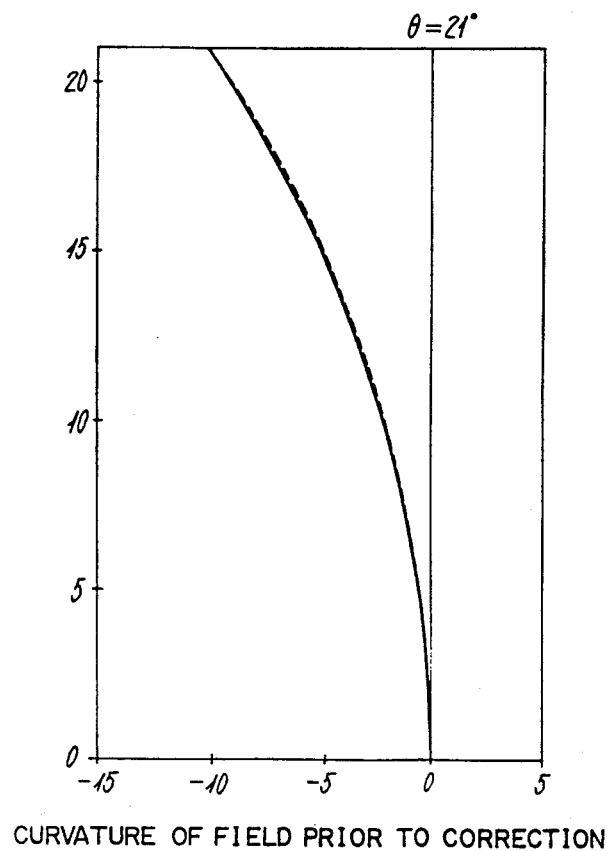
CURVATURE OF FIELD PRIOR TO CORRECTION

CURVATURE OF FIELD AFTER CORRECTION (E=0.5)

CURVATURE OF FIELD AFTER CORRECTION (E=0.7)

fθ CHARACTERISTICS

------- MERIDIONAL
——— SAGITTAL

CURVATURE OF FIELD PRIOR TO CORRECTION

CURVATURE OF FIELD AFTER CORRECTION (E=0.5)

CURVATURE OF FIELD AFTER CORRECTION (E=0.7)

F I G. 21
F I G. 22
-------- MERIDIONAL
———— SAGITTAL
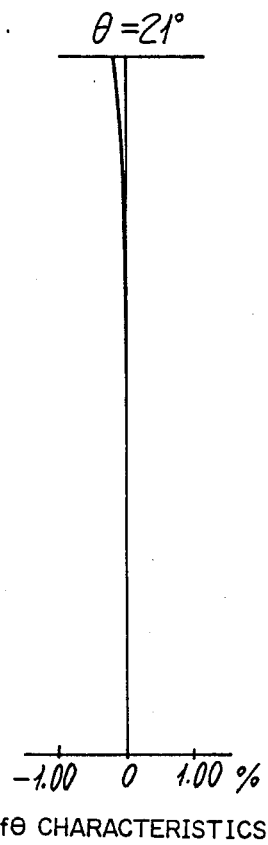
fθ CHARACTERISTICS
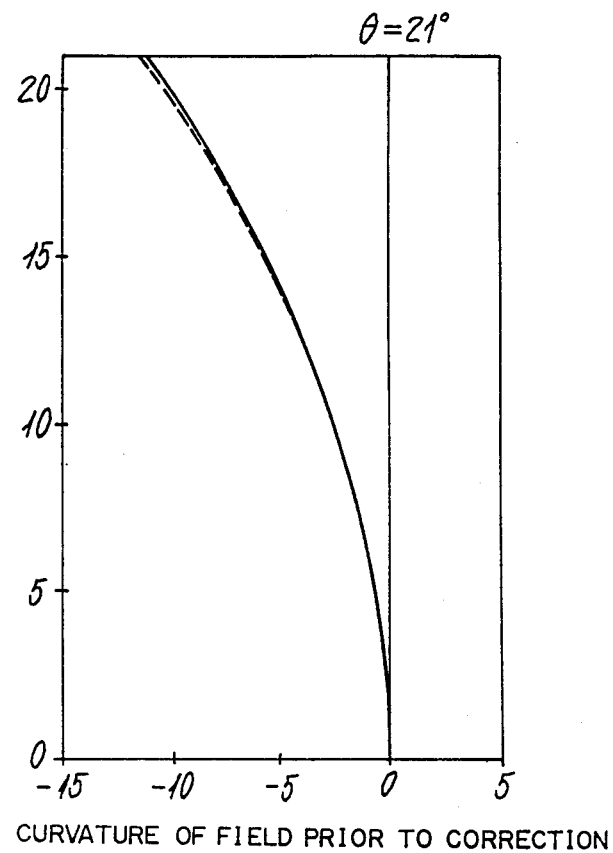
CURVATURE OF FIELD PRIOR TO CORRECTION (E=0.5)

(E=0.7)

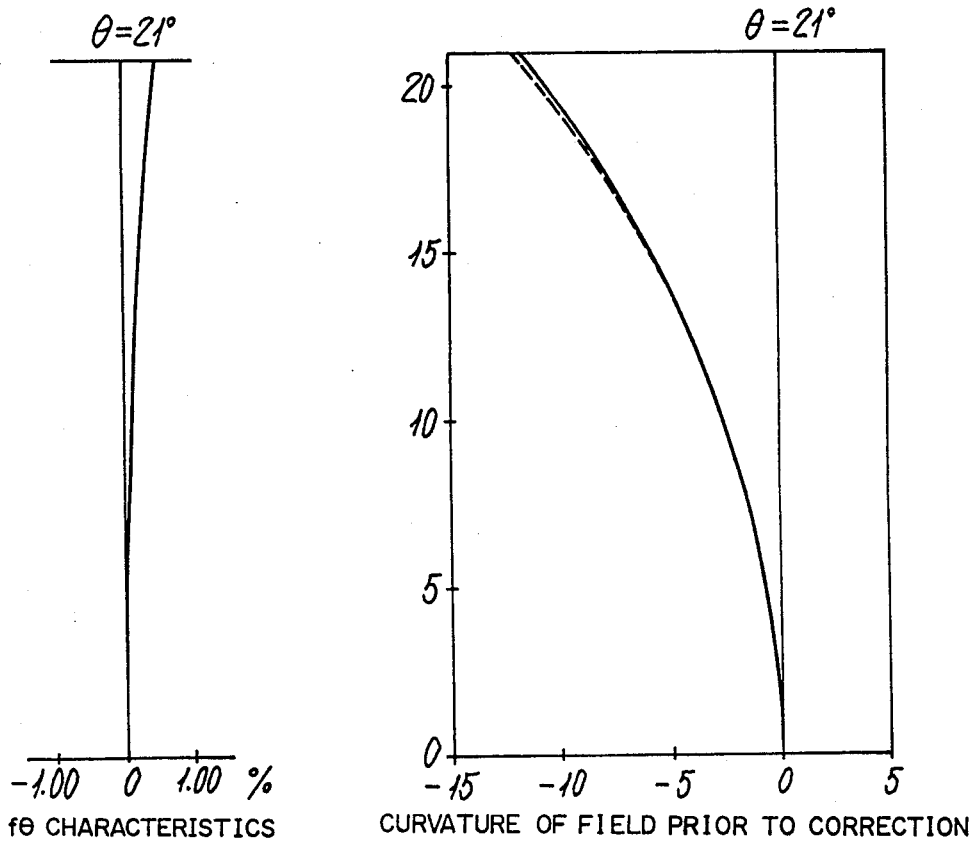

F I G. 26 (A) F I G. 26 (B)
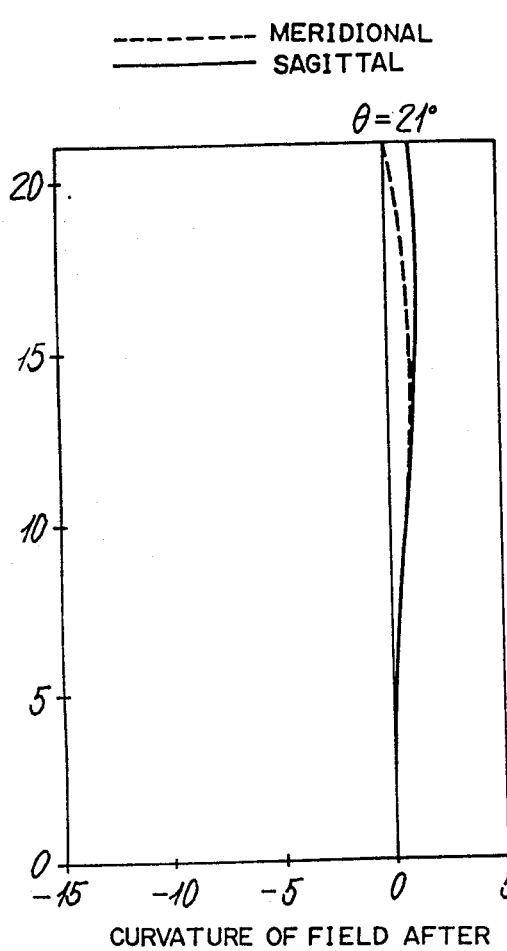
(E=0.5)
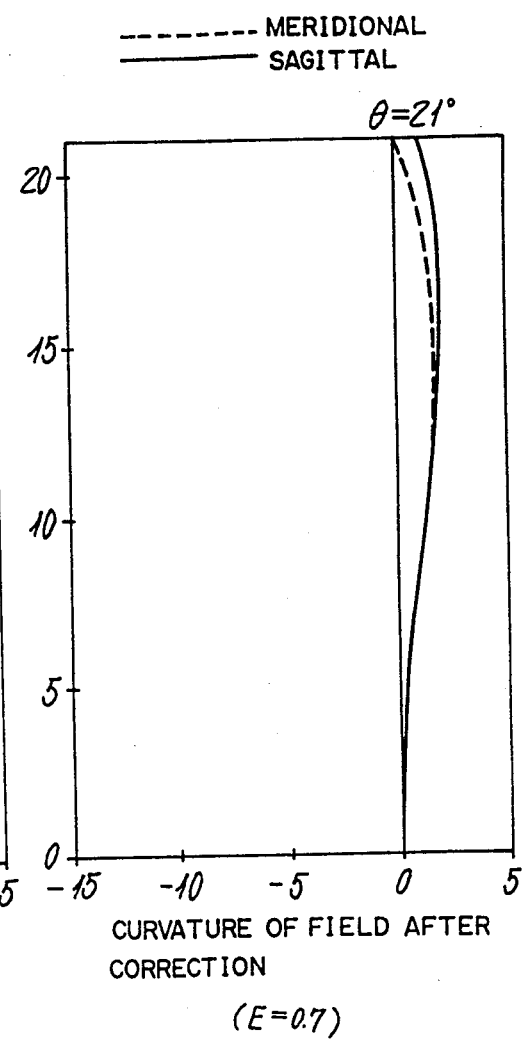
(E=0.7)

fθ CHARACTERISTICS

------ MERIDIONAL
——— SAGITTAL

CURVATURE OF FIELD PRIOR TO CORRECTION

F I G. 29 (A)
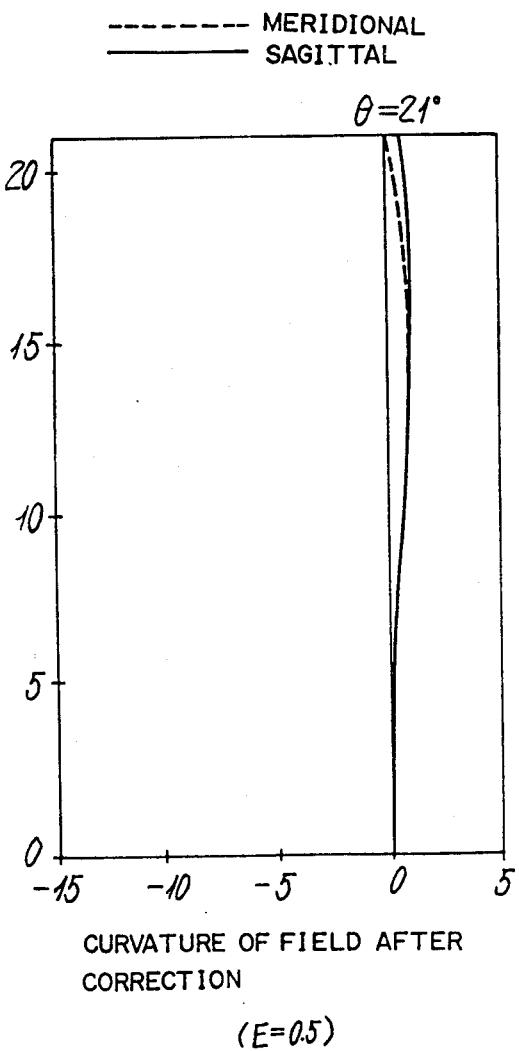
CURVATURE OF FIELD AFTER CORRECTION
(E=0.5)
F I G. 29 (B)
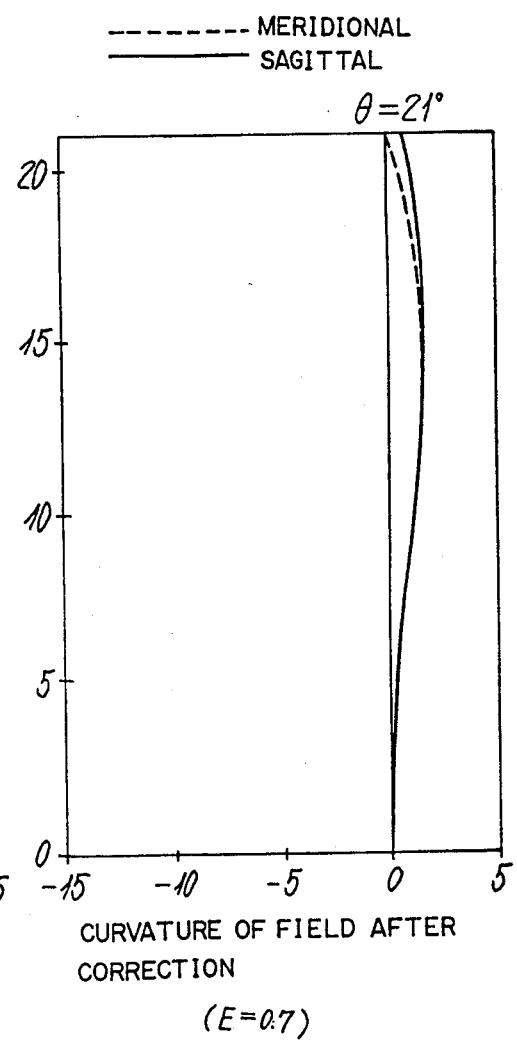
CURVATURE OF FIELD AFTER CORRECTION
(E=0.7)

F I G. 31
F I G. 30
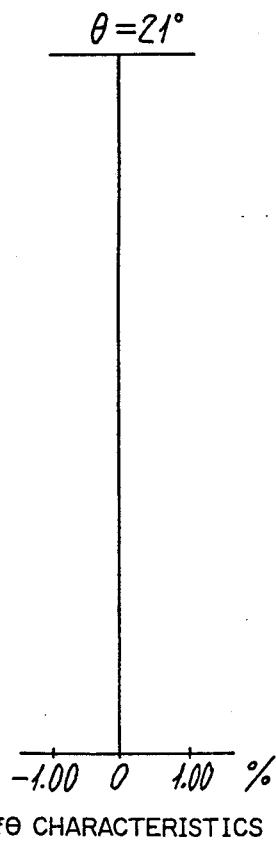
fθ CHARACTERISTICS
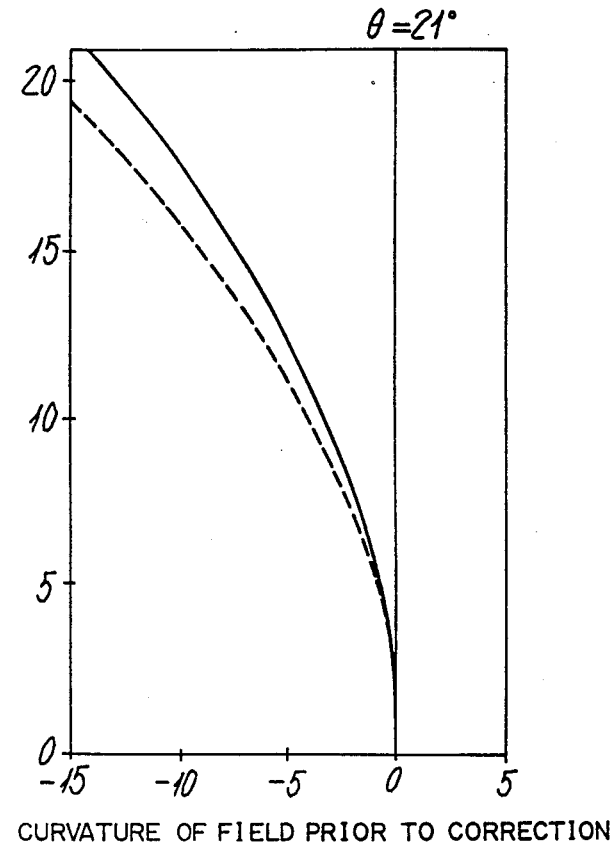
CURVATURE OF FIELD PRIOR TO CORRECTION

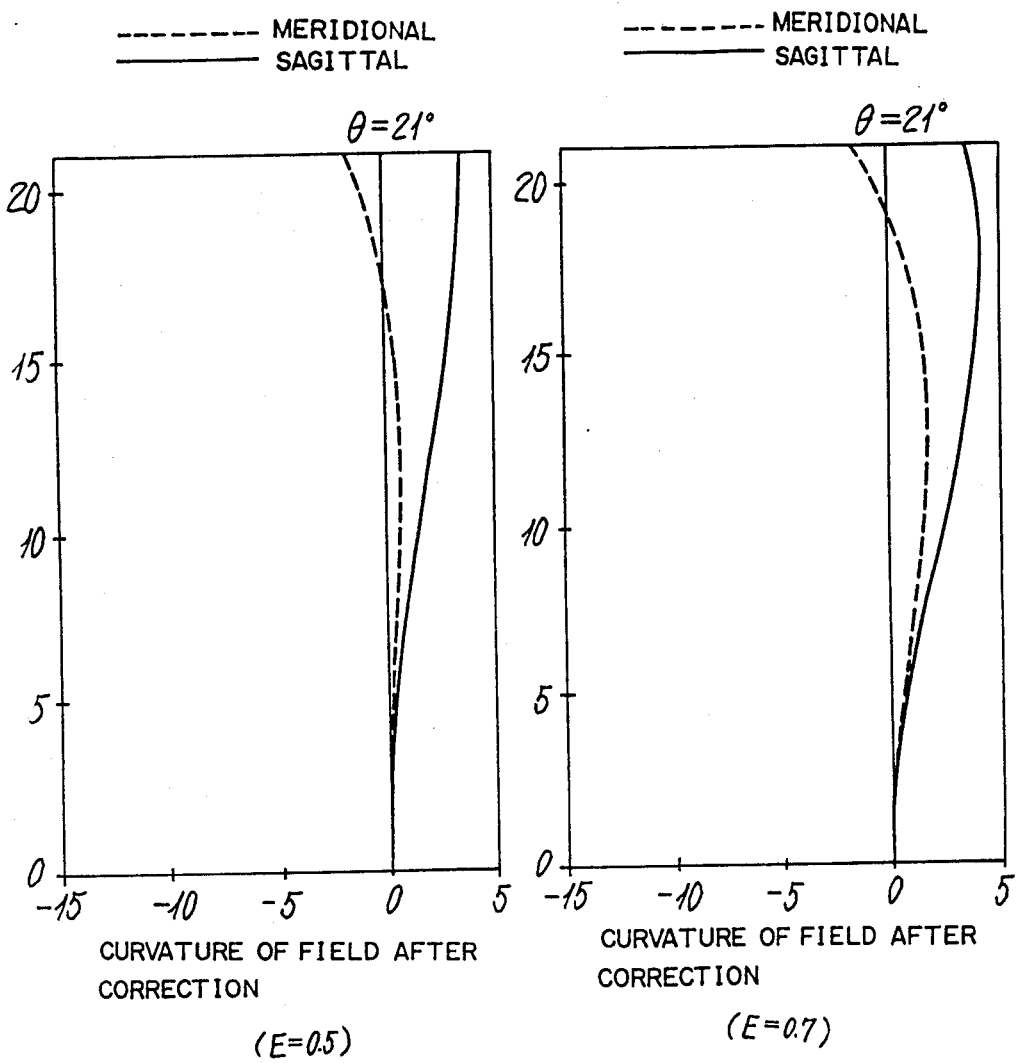
FIG. 32 (A) — (E=0.5)
FIG. 32 (B) — (E=0.7)

COLLIMATED LIGHT BEAM SCANNING METHOD INCLUDING CURVATURE OF FIELD CORRECTION

BACKGROUND OF THE INVENTION

The present invention relates to a light scanning method of scanning a surface with a light beam emitted from a laser beam source.

There is widely known a light scanning method of scanning a surface with a light beam emitted from a laser beam source by applying the light beam through a collimator lens to a rotating light deflector, deflecting the light beam with the light deflector, and applying the deflected light beam through an fθ lens to the surface to be scanned.

The rotating light deflector may be a rotating polygon mirror or a pyramidal mirror. Since the light beam is deflected at a uniform angular velocity by the rotating light deflector, the fθ lens is necessary to scan the surface with the light beam at a constant velocity.

The fθ lens is also effective in focusing the deflected light beam as a light spot on the surface being scanned. Therefore, a good fθ lens has so-called fθ characteristics and curvature of field well corrected. If the curvature of field were not sufficiently corrected, the size of the light spot which scans the surface would be greatly varied dependent on the scanning position. For writing optical information, for example, the resolution of a recorded image would not be uniform in the image.

It is not necessarily easy to well correct both fθ characteristics and curvature of field of an fθ lens. An fθ lens which meets the desired well-corrected conditions may have problems in that the lens is of a complex arrangement and of a high cost.

SUMMARY OF THE INVENTION

In view of the aforesaid drawbacks of the prior art, it is an object of the present invention to provide a light scanning method which employs an fθ lens of simple lens arrangement, is capable of well correcting the curvature of field, and allows good light scanning operation.

According to the light scanning method, a laser beam emitted from a laser beam source is applied through a collimator lens to a rotating light deflecting means, which deflects the laser beam, and the deflected laser beam is applied via an fθ lens to a surface to scan the surface.

The rotating light deflecting means may comprise a rotating polygon mirror or a pyramidal mirror.

The fθ lens comprises a single lens and has its fθ characteristics well corrected.

The curvature of field by the fθ lens is corrected by vibrating the collimator lens or the laser beam source in simple harmonic motion to displace the position where the laser beam is focused by the fθ lens.

More specifically, where the collimator lens is vibrated in simple harmonic motion, it is vibrated in the direction of the optical axis thereof in synchronism with light scanning.

Where the laser beam source is vibrated in simple harmonic motion, it is vibrated in the direction of the optical axis of the collimator lens in synchronism with light scanning.

If an fθ lens were well corrected for both the fθ characteristics and the curvature of field, the lens arrangement thereof would be complex, as described above.

However, if only the fθ characteristics should be corrected, an fθ lens comprising a single lens can easily realize such fθ characteristics correction, and the fθ characteristics can very well be corrected.

Based on this fact, according to the present invention, the fθ lens comprises a single lens with its fθ characteristics well corrected.

The curvature of field is corrected by vibrating the collimator lens or the laser beam source in simple harmonic motion.

With the present invention, therefore, the fθ characteristics of a single-element fθ lens are well corrected, whereas the curvature of field is well corrected by vibrating the collimator lens of the laser beam source in simple harmonic motion.

Since a single-element fθ lens is employed, a light scanning device is small in size and inexpensive to manufacture.

BRIEF DESCRIPTION OF THE DRAWINGS

FIGS. 15, 16, 17(a) and 17(b) are diagrams of aberrations explaining Example 3;

FIGS. 21, 22, 23(a) and 23(b) are diagrams of aberrations explaining Example 5;

FIGS. 24, 25, 26(a) and 26(b) are diagrams of aberrations explaining Example 6;

FIGS. 27, 28, 29(a) and 29(b) are diagrams of aberrations explaining Example 7; and FIGS. 30, 31, 32(a) and 32(b) are diagrams of aberrations explaining Example 8.

DETAILED DESCRIPTION OF THE INVENTION

The present invention will now be described in detail with reference to the drawings.

Figure 1:
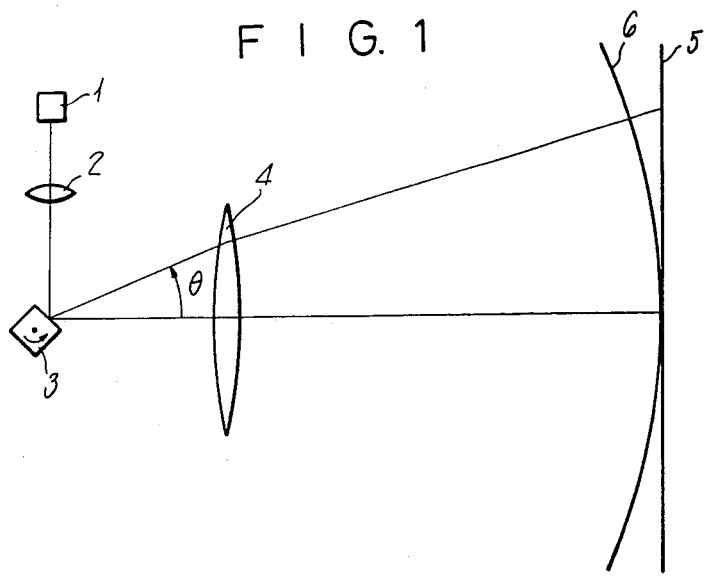
FIG. 1 is a schematic view showing an optical arrangement of a light scanning device to which the present invention is applied.

FIG. 1 schematically shows a device for carrying out the present invention, the view illustrating only those portions necessary for describing the invention. The reference numeral 1 denotes an LD (laser diode) as a light source. A laser beam from the LD 1 is applied through a collimator lens 2 to a rotating polygon mirror 3 as a rotating light deflecting means. The laser beam reflected by the rotating polygon mirror 3 is applied to a single-element fθ lens 4 and passes therethrough to a surface 5 being scanned.

When the rotating polygon mirror 3 is rotated, the laser beam reflected thereby is deflected to scan the surface 5. The fθ lens 4 is well corrected for its fθ characteristics, so that the surface 5 is scanned with the laser beam at a constant speed. However, the fθ lens 4 produces a large curvature of field 6 of an arcuate pattern.

The curvature of field 6 is represented by a path followed by a focused light spot of the deflected laser beam which is produced by converting the laser beam from the LD 1 into a parallel-ray beam and applying the parallel-ray beam to the fθ lens 4 while rotating the rotating polygon mirror 3. Since the focused light spot is positionally deviated from the surface 5 as the deflection angle θ is increased, if the surface 5 were scanned by such an optical system, the diameter of the light spot as it moves toward the opposite ends of the scanned area on the surface 5 would be progressively increased, thus lowering the resolution of the light scanning process. The curvature of field is corrected by moving the collimator lens 2 in accordance with the present invention.

FIG. 2(A) shows an optical system where the light path extending from the LD 1 to the scanned surface 5 is indicated by a straight line. In FIG. 2(A), the deflection angle θ (see FIG. 1) is assumed to be 0.

The laser beam emitted from the LD 1, converted into the parallel-ray beam by the collimator lens 2, and applied to the fθ lens 4 is focused as a light spot on the scanned surface 5 as indicated by the solid line. Stated otherwise, the collimator lens 2 is in the solid-line position at this time, and the distance between the collimator lens 2 and the LD 1 is equal to the focal length $f_1$ of the collimator lens 2. The distance between the fθ lens 4 and the scanned surface 5 is equal to the focal length $f_2$ of the fθ lens 4.

When the collimator lens 2 is displaced by a distance Δ along the optical axis toward the object into the broken-line position, the laser beam that has passed through the collimator lens 2 becomes slightly divergent, and a plane 5A where the laser beam is focused by the fθ lens 4 is shifted by a distance Z behind the scanned surface 5, thus focusing the laser beam as a light spot on the focusing plane 5A. Since the focusing point is positionally displaced by displacing the collimator lens 2 on the optical axis, the curvature of field is corrected on the basis of such a condition.

Assuming that the distance from the image-side focal point of the collimator lens 2 in the solid-line position of FIG. 2(A) to the object-side focal point of the fθ lens 4 is indicated by d, the amount Z of displacement of the focusing plane 5A is expressed by the following equation (1):

$$Z = \frac{f_2^2}{(f_1^2/\Delta) + d + \Delta} \quad (1)$$

When $f_1 >> \Delta$, the equation (1) can approximately be written as:

$$Z = (f_2/f_1) \cdot \Delta \quad (1-1)$$

The equation (1) can be solved for Δ by the following equation (2):

$$\Delta = (\tfrac{1}{2})\{((f_2^2/Z) - d) - \sqrt{((f_2^2/Z) - d)^2 - 4f_1^2}\} \quad (2)$$

In FIG. 1, the point where the optical axis of the collimator lens 2 and the deflecting facet of the rotating polygon mirror 3 intersect is referred to as a deflection point. The fθ lens 4 is arranged such that its optical axis is substantially aligned with a perpendicular line extending from the deflection point to the scanned surface 5.

Figure 2:
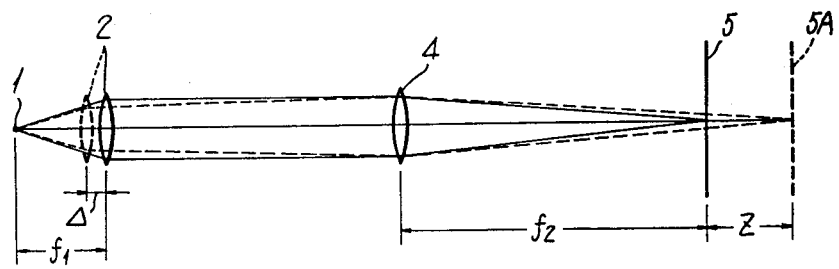
FIG. 2(A) is a view explaining the manner in which the point where a light beam is focused by an fθ lens is displaced by moving a collimator lens.
FIG. 2(B) is a view explaining the manner in which the point where a light beam is focused by an fθ lens is displaced by moving a laser diode as a laser beam source.
Figure 2:
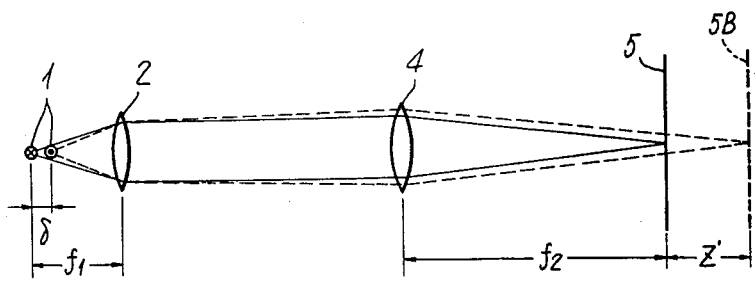

Assuming that the curvature of field 6 is expressed as a function of the deflection angle θ by D=D(θ), it will be considered that when such curvature of field D(θ) is being generated, the collimator lens 2 is moved along the optical axis to correct the curvature of field. More specifically, the focused position by the fθ lens 4 is displaced by moving the collimator lens 2 to offset a deviation from the scanned surface of the focused light spot due to the curvature of field. The amount Δ' of displacement of the collimator lens 2 which is necessary for such correction is given with respect to the deflection angle θ and the curvature of field D(θ) by the following equation (3):

$$\Delta' = (\tfrac{1}{2})\{((f_2^2/D(\theta)) + L_1)\cos\theta - L_2 - \sqrt{((f_2^2/D(\theta)) + L_1\cos\theta - L_2)^2 - 4f_1^2}\} \quad (3)$$

where $L_1$ is the distance from the object-side focal point of the fθ lens 4 to the deflection point, and $L_2$ is the distance from the image-side focal point of the collimator lens 2 in the solid-line position of FIG. 2 to the deflection point. The deflection angle θ is set to 0 when the deflected laser beam is applied along the optical axis of the fθ lens 4 to the fθ lens 4, as shown in FIG. 1. The equation (3) can be obtained from the equation (1) by replacing d with $L_2 - L_1\cos\theta$ and $(f_2^2/Z)$ with $(f_2^2/D(\theta))\cos\theta$.

Figure 3:
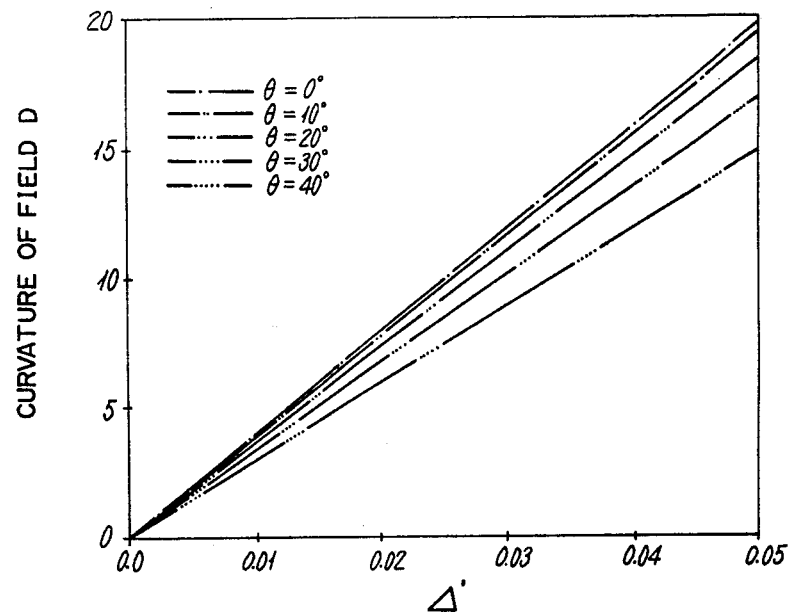
FIGS. 3(A) and 3(B) are diagrams showing the interval by which a collimator lens or a laser diode is displaced for completely correcting the curvature of field by an fθ lens.

For more specific explanation, when $f_1 = 15$, $f_2 = 295$, $L_1 = 150$, $L_2 = 50$, values of Δ' with respect to the curvature of field D are calculated with the deflection angle θ used as a parameter, and the results of such calculations are shown in FIG. 3(A).

The equation (3) is solved for D(θ) according to the following equation (4):

$$D(\theta) = (f_2^2\cos\theta)/\{(f_1^2/\Delta') + L_2 - L_1\cos\theta + \Delta'\} \quad (4)$$

The equation (4) indicates that by displacing the collimator lens 2 toward the light source by Δ', the field or image plane can be moved toward the scanned surface 5 by D(θ) at the deflection angle θ.

When $\Delta' << f_1$, the equations (3) and (4) can approximately be written as follows:

$$\Delta' = (f_1/f_2)^2 (D(\theta)/\cos\theta) \quad (3-1)$$

$$D(\theta) = (f_2/f_1)^2 \Delta' \cos\theta \quad (4-2)$$

As described above, by displacing the collimator lens 2 according to the equation (3) dependent on the deflection angle θ, the curvature of field can be fully corrected. However, it is difficult to actually displace the collimator lens 2 in this manner. According to the present invention, the collimator lens 2 is vibrated in simple harmonic motion, and the movement represented by the equation (3) is approximately by the displacement of the collimator lens 2 due to such simple harmonic motion for substantially well correcting the curvature of field.

Inasmuch as the deflection of the laser beam by the rotating polygon mirror 3 is effected at a uniform angularly velocity, assuming that the light scanning is effected $\gamma$ times in a unit time, the deflection angle $\theta$ can be expressed, if the time t is in the range of $n-\frac{1}{2}<\gamma\cdot t<n+\frac{1}{2}$ (n is an integer), as follows:

$$\theta = 2(\gamma t - n)\theta max/E \quad (5)$$

where $\theta$max is the maximum deflection angle ($-\theta$max $\leq \theta \leq \theta$max), and E is a quantity represented by $E=\gamma\tau$ where $\tau$ is a time required for $\theta$ to vary from $-\theta$max to $\theta$max, indicating the proportion of the time in which the deflected laser beam effects effective light scanning.

The collimator lens 2 is positioned such that when the deflection angle $\theta$ is $\theta=0$ and $\theta=\pm\theta$max, the focused position by the f$\theta$ lens 4, i.e., the focused spot position lies on the scanned surface 5. Assuming that the position of the collimator lens 2 when $\theta=0$ is defined as a reference position, and the collimator lens 2 is displaced on the light source side of the reference position, by vibrating the collimator lens 2 in simple harmonic motion at a frequency, $\gamma$, i.e., a scanning frequency in synchronism with the light scanning, the curvature of field can well be corrected not only at $\theta=0$ and $\theta=\pm\theta$max but also in an entire range of deflection angles as the curvature of field 6 ($D(\theta)$) by the f$\theta$ lens 4 is not of a complex shape.

Assuming that the amplitude A is given by:

Assuming that the amplitude $A$ is given by:

$$A = X_0/\{1 - \cos(\pi E)\},$$

where $X_0 = (\frac{1}{2})[(f_2^2/D_0 + L_1)\cos\theta max - L_2 - \sqrt{\{((f_2^2/D_0) + L_1)\cos\theta max - L_2\}^2 - 4f_1^2}] \quad (6)$ the simple harmonic motion can be expressed by:

$$X = A\{1 - \cos(2\pi\nu t)\} \quad (7)$$

In the equation (6), $D_0$ is the curvature of field, i.e., $D_0 = D(\theta max)$ when $\theta = \theta$max, and $X_0$ is the amount by which the collimator lens 2 needs to be moved to bring the focused spot into alignment with the scanned surface when $\theta = \theta$max.

Figure 4:
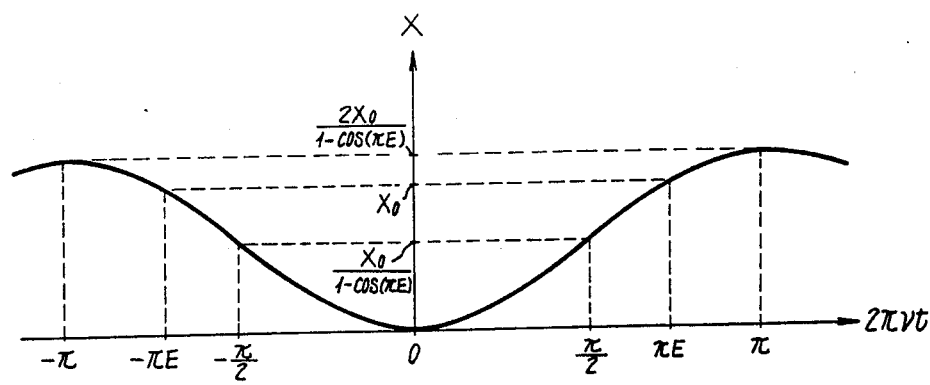
FIGS. 4 and 5 are diagrams explaining simple harmonic motion of the collimator lens.

FIG. 4 shows such simple harmonic motion. Using the equation (5), the variable in the equation (7) is changed from the time t to the deflection angle $\theta$ as follows:

$$X = X(\theta) = A\{1 - \cos(\pi E\cdot\theta/\theta max)\} \quad (8)$$

Figure 5:
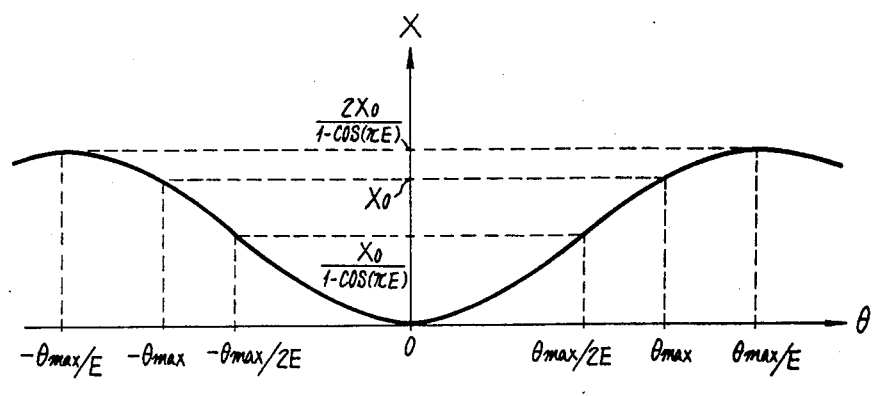

The equation (8) is indicated in FIG. 5.

By causing the collimator lens 2 to effect the simple harmonic motion defined by the equation (7), the focused point of the deflected laser beam is moved toward the scanning surface by:

$$G(\theta) = (f_2^2\cos\theta)/\{(f_1^2/X(\theta)) + L_2 - L_1\cos\theta + X(\theta)\} \quad (9)$$

as calculated according to the equation (4). Therefore, the $G(\theta)$ represents the amount by which the curvature of field is corrected by the simple harmonic motion of the collimator lens 2. Thus, the curvature of field which is indicated by $-D(\theta)$ prior to correction becomes $$D'(\theta) = -D(\theta) + G(\theta) \quad (10)$$

after correction.

Specifically, if the aforesaid numerical values $f_1=15$, $f_2=295$, $L_1=150$, and $L_2=50$ are employed, the amount of correction $G(\theta)$ for the parameter $E=0.5$ and 0.7 is given in the following tables 1 and 2:

TABLE 1

| | (E = 0.5) | |
|---|---|---|
| $\theta°$ | $X(\theta)$ | $G(\theta)$ |
| 0 | 0.0 | 0.0 |
| 5 | 0.0019 | 0.73 |
| 10 | 0.0073 | 2.79 |
| 15 | 0.0155 | 5.83 |
| 20 | 0.0254 | 9.31 |
| 21 | 0.0274 | 10.00 |

TABLE 2

| | (E = 0.7) | |
|---|---|---|
| $\theta°$ | $X(\theta)$ | $G(\theta)$ |
| 0 | 0.0 | 0.0 |
| 5 | 0.0023 | 0.89 |
| 10 | 0.0086 | 3.30 |
| 15 | 0.0173 | 6.49 |
| 20 | 0.0259 | 9.51 |
| 21 | 0.0274 | 10.00 |

The collimator lens can be vibrated in simple harmonic motion by a voice coil, a piezoelectric semiconductor, or a precise actuating mechanism known in relation to the control of an objective lens of an optical pickup.

In the above description, the curvature of field by the f$\theta$ lens is corrected by vibrating the collimator lens in simple harmonic motion.

Correction of the same curvature of field is corrected by vibrating the laser beam source in simple harmonic motion as follows:

FIG. 2(B) shows the light path from the LD 1 to the scanned surface 5 on a straight line.

The laser beam emitted from the LD 1 is converted into a parallel-ray beam by the collimator lens 2, and applied to the f$\theta$ lens 4 by which it is focused as a light spot on the scanned surface 5.

Stated otherwise, the LD 1 is in the position indicated by ⊗, and the distance between the collimator lens 2 and the LD 1 is equal to the focal length $f_1$ of the collimator lens 2. The distance between the f$\theta$ lens 4 and the scanned surface 5 is equal to the focal length $f_2$ of the f$\theta$ lens 4.

When the LD 1 is displaced by a distance $\delta$ along the optical axis toward the collimator lens 2 into the position indicated by ⊙, the laser beam that has passed through the collimator lens 2 becomes slightly divergent, and a plane 5B where the laser beam is focused by the f$\theta$ lens 4 is shifted by a distance Z' behind the scanned surface 5, thus focusing the laser beam as a light spot on the focusing plane 5B. Since the focusing point is positionally displaced by displacing the LD 1 on the optical axis, the curvature of field is corrected on the basis of such a condition.

Assuming that the distance from the image-side focal point of the collimator lens 2 in FIG. 2(A) to the object-side focal point of the f$\theta$ lens 4 is indicated by d (d is positive when the image-side focal point of the collimator lens 2 is on the light source side, and negative when it is on the focusing plane size), the amount Z' by which the focusing plane 5B is displaced is expressed by the following equation (11):

$$Z' = \frac{f_2^2}{(f_1^2/\delta) + d} \quad (11)$$

The equation (11) is solved for δ according to the following equation (12):

$$\delta = \frac{f_1^2}{(f_2^2/Z') - d} \quad (12)$$

As described above, the curvature of field 6 can be expressed as a function of the deflection angle θ according to D=D(θ). It will be considered that when the curvature of field D(θ) is generated, the LD 1 is moved along the optical axis to correct the curvature of field. More specifically, the focused position by the fθ lens 4 is displaced by moving the LD 1 to offset a deviation from the scanned surface of the focused light spot due to the curvature of field. The amount δ of displacement of the LD 1 which is necessary for such correction is given with respect to the deflection angle θ and the curvature of field D(θ) by the following equation (13):

$$\delta' = \frac{f_1^2}{\frac{f_2^2 \cos\theta}{D(\theta)} - L_2 + L_1\cos\theta} \quad (13)$$

where $L_1$ is the distance from the object-side focal point of the fθ lens 4 to the deflection point, and $L_2$ is the distance from the image-side focal point of the collimator lens 2 to the deflection point. The deflection angle θ is set to 0 when the deflected laser beam is applied along the optical axis of the fθ lens 4 to the fθ lens 4, as shown in FIG. 1. The equation (13) can be obtained from the equation (12) by replacing d with $L_2-L_1\cos\theta$ and $(f_2^2/Z')$ with $(f_2^2/D(\theta))\cos\theta$.

For more specific explanation, as with vibrating the collimator lens 2 in simple harmonic motion as described above, when $f_1=15$, $f_2=295$, $L_1=150$, $L_2=50$, values of δ with respect to to the curvature of field D are calculated with the deflection angle θ used as a parameter, and the results of such calculations are shown in FIG. 3(B).

The equation (13) is solved for D(θ) according to the following equation (14):

$$D(\theta) = \frac{f_2^2\cos\theta}{\frac{f_1^2}{\delta'} + L_2 - L_1\cos\theta} \quad (14)$$

The equation (14) indicates that by displacing the LD 1 toward the collimator lens 2 by δ', the field or image plane can be moved toward the scanned surface 5 by D(θ) at the deflection angle θ.

When δ' << $f_1$, the equations (13) and (14) can approximately be written as follows:

$$\delta' = (f_1/f_2)^2(D(\theta)/\cos\theta) \quad (13\text{-}1)$$

$$D(\theta) = (f_2/f_1)^2 \delta' \cos\theta \quad (14\text{-}2)$$

These equations (13-1) and (14-2) correspond respectively to the equations (3-1) and (4-2).

As described above, by displacing the LD 1 according to the equation (13) dependent on the deflection angle θ, the curvature of field can be fully corrected. However, it is difficult to actually displace the LD 1 in this manner. According to the present invention, the LD 1 is vibrated in simple harmonic motion, and the movement represented by the equation (13) is approximately by the displacement of the LD 1 due to such simple harmonic motion for substantially well correcting the curvature of field.

Figure 6:
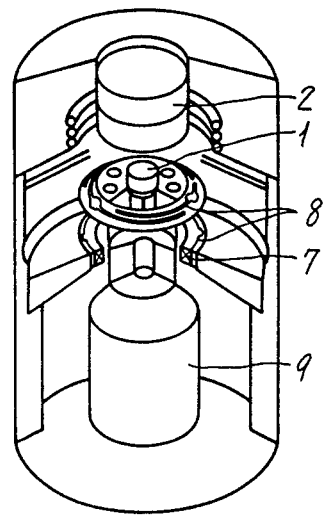
FIG. 6 is a view showing a mechanism for vibrating the laser diode in simple harmonic motion.

A voice coil motor as one example of a device for vibrating the LD 1 in simple harmonic motion is shown in FIG. 6. A coil 7 is wound on a moving component to which the LD is attached, and the moving component is supported by flexible members 8 having a small spring constant only in the axial direction. Forces along the optical axis are generated between a current flowing through the coil 7 and a magnetic field for displacing the LD 1 uniaxially in simple harmonic motion without deviation from the optical axis. Denoted at 9 is a magnet.

Assuming that the scanning frequency of the deflected laser beam deflected by the rotating polygon mirror 3 is γ, i.e., the light scanning is effected γ times in a unit time, the deflection angle θ can be expressed, if the time t is in the range of $n-\frac{1}{2}<\gamma t<n+\frac{1}{2}$ (n is an integer), by the equation (5) referred to above, which is:

$$\theta = 2(\gamma t - n)\theta\max/E \quad (5)$$

where θmax is the maximum deflection angle ($-\theta\max \geq \theta \geq \theta\max$), and E is a quantity represented by $E=\gamma\tau$ where τ is a time required for θ to vary from -θmax to θmax, indicating the proportion of the time in which the deflected laser beam effects effective light scanning, as described above.

The LD 1 is positioned such that when the deflection angle θ is θ=0 and θ=±θmax, the focused position by the fθ lens 4, i.e., the focused spot position lies on the scanned surface 5. Assuming that the position of the LD 1 when θ=0 is defined as a reference position, and the LD 1 is displaced on the light source side of the reference position, by vibrating the LD 1 in simple harmonic motion at the frequency γ, i.e., the scanning frequency in synchronism with the light scanning, the curvature of field can well be corrected not only at θ=0 and θ=±θmax but also in an entire range of deflection angles as the curvature of field 6 (D(θ)) by the fθ lens 4 is not of a complex shape.

Assuming that the amplitude A' is given by:

$$A_1 = X_1/\{1 - \cos(\pi E)\},$$

$$\text{where } X_1 = \frac{f_1^2}{\frac{f_2^2 \cos\theta\max}{D_0} - L_2 + L_1\cos\theta\max} \quad (15)$$

the simple harmonic motion can be expressed by:

$$X = A'\{1 - \cos(2\pi\nu t)\} \quad (16)$$

In the equation (15), $D_0$ is the amount by which the LD 1 needs to be moved to bring the focused spot into alignment with the scanned surface when θ=θmax.

Figure 7:
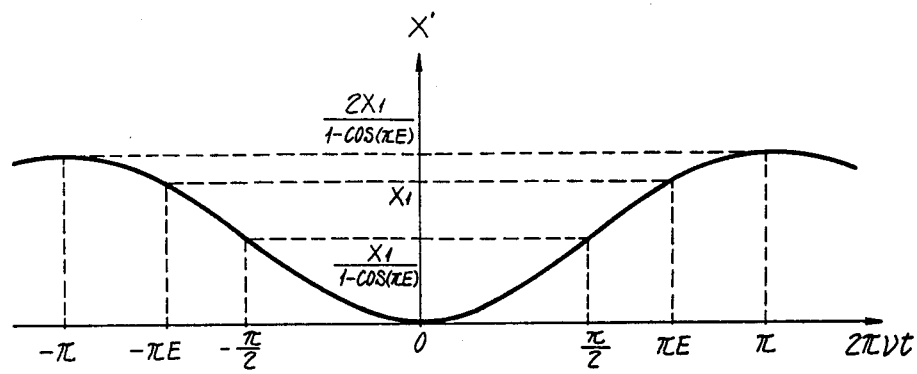
FIGS. 7 and 8 are diagrams explaining simple harmonic motion of the laser diode.
Figure 8:
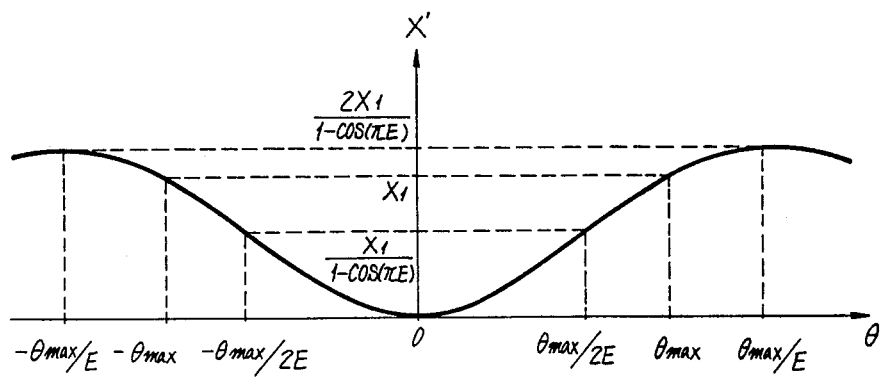

FIG. 7 shows such simple harmonic motion. Using the equation (5), the variable in the equation (16) is changed from the time t to the deflection angle $\theta$ as follows:

$$X' = X'(\theta) = A'\{1 - \cos(\pi E \cdot \theta/\theta max)\} \quad (17)$$

The equation (17) is indicated in FIG. 6.

By causing the LD 1 to effect the simple harmonic motion defined by the equation (16), the focused point of the deflected laser beam is moved toward the scanning surface 5 by:

$$G'(\theta) = \frac{f_2{}^2 \cos\theta}{\dfrac{f_1{}^2}{X'(\theta)} + L_2 - L_1 \cos\theta} \quad (18)$$

as calculated according to the equation (14). Therefore, the $G'(\theta)$ represents the amount by which the curvature of field is corrected by the simple harmonic motion of the LD 1. Thus, the curvature of field which is indicated by $-D(\theta)$ prior to correction becomes $$D'(\theta) = -D(\theta) + G'(\theta) \quad (19)$$

after correction.

Specifically, if the aforesaid numerical values $f_1 = 15$, $f_2 = 295$, $L_1 = 150$, and $L_2 = 50$ are employed, the amount of correction $G'(\theta)$ for the parameter $E = 0.5$ and 0.7 is given in the following tables 3 and 4:

TABLE 3

| | (E = 0.5) | |
|---|---|---|
| $\theta$ | $X'(\theta)$ | $G(\theta)$ |
| 0 | 0.0 | 0.0 |
| 5 | 0.0019 | 0.73 |
| 10 | 0.0073 | 2.79 |
| 15 | 0.0155 | 5.83 |
| 20 | 0.0254 | 9.31 |
| 21 | 0.0274 | 10.00 |

TABLE 4

| | (E = 0.7) | |
|---|---|---|
| $\theta$ | $X'(\theta)$ | $G(\theta)$ |
| 0 | 0.0 | 0.0 |
| 5 | 0.0023 | 0.89 |
| 10 | 0.0086 | 3.30 |
| 15 | 0.0173 | 6.49 |
| 20 | 0.0259 | 9.51 |
| 21 | 0.0274 | 10.00 |

Eight specific examples will be given below. In each of the examples, $f_1 = 15$, $f_2 = 295$, and $\theta max = 21°$. Each of the examples is numerically represented by the shape of the $f\theta$ lens, the refractive index thereof, the distance $L_1$ from the object side focal point of the $f\theta$ lens to the deflection point, the distance $L_2$ from the image side focal point of the collimator lens 2 to the deflection point when the collimator lens 2 is in a position to collimate the laser beam from the LD 1, the curvature of field $D_0 = D(\theta max)$ when $\theta = \theta max$, and the amount of movement $X_0$ of the collimator lens or the amount of movement $X_1$ of the LD, necessary for bringing the focused spot on the scanned surface when $\theta = \theta max$. $r_1$, $r_2$ represent the radii of curvature of lens surfaces of the $f\theta$ lens on the object and image sides, respectively, $L_0$ the thickness of the lens, n the refractive index of the lens. In the examples 1 through 4 shown in the table 5, the collimator lens is vibrated in simple harmonic motion.

TABLE 5

| | Example 1 | Example 2 | Example 3 | Example 4 |
|---|---|---|---|---|
| $r_1$ | ∞ | −1000 | −1000 | 1000 |
| $r_2$ | −206.5 | −171.861 | −210.792 | −172.444 |
| $L_0$ | 10 | 10 | 10 | 10 |
| n | 1.7 | 1.7 | 1.9 | 1.5 |
| $L_1$ | 169.118 | 162.932 | 148.371 | 194.298 |
| $L_2$ | 69.118 | 36.654 | 36.654 | 36.654 |
| $D_0$ | 11.7 | 11.9 | 10.1 | 17.5 |
| $X_0$ | 0.032 | 0.0324 | 0.0276 | 0.047 |

Figure 9:
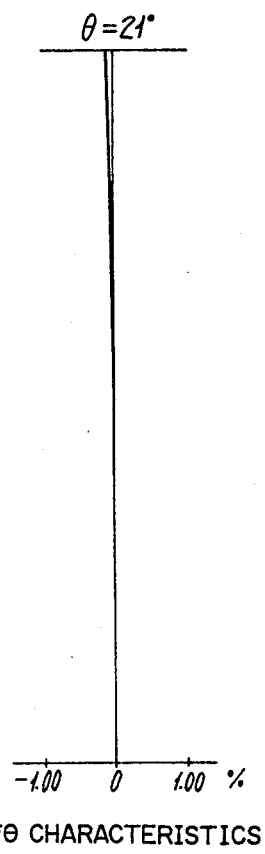
FIGS. 9, 10, 11(a) and 11(b) are diagrams of aberrations explaining Example 1.
Figure 10:
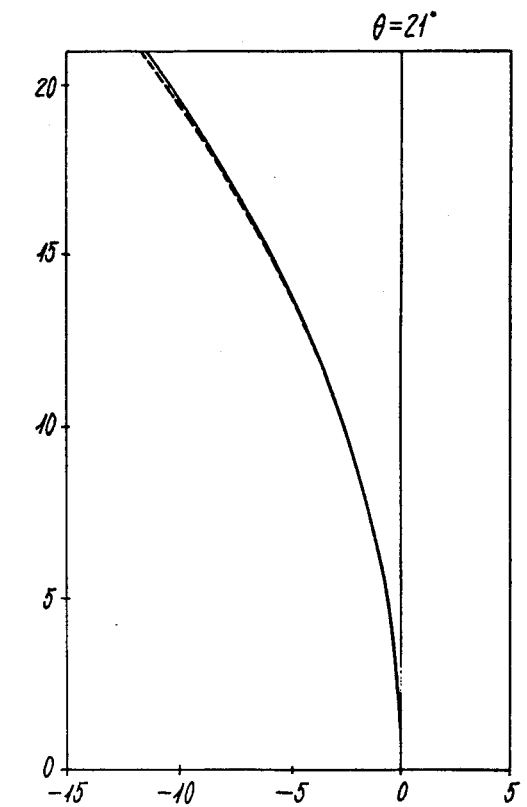
Figure 11:
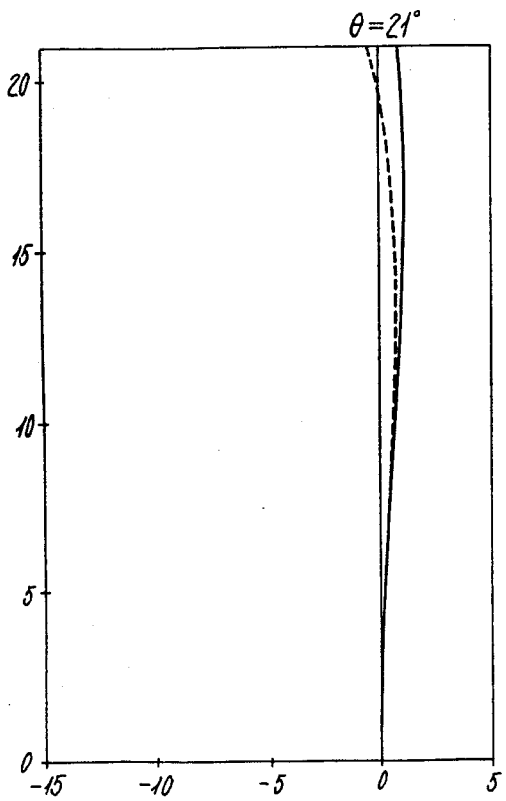
Figure 11:
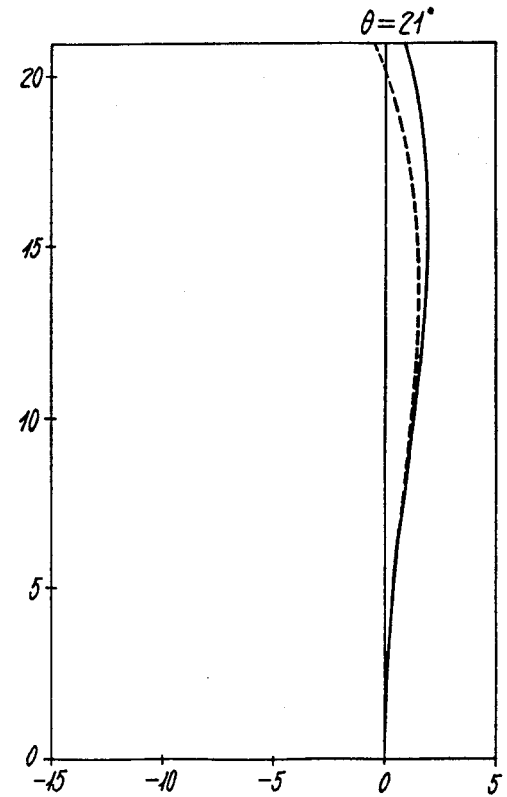

FIG. 9 and following figures show aberrations of the examples. FIGS. 9, 10, 11(a) and 11(b) are illustrative of aberrations of the example 1. FIG. 9 shows the $f\theta$ characteristics, FIG. 10 shows the curvature of field which is not corrected by simple harmonic motion of the collimator lens (referred to as the curvature of field prior to correction), and FIGS. 11(a) and 11(b) show the curvature of field after correction.

Figure 12:
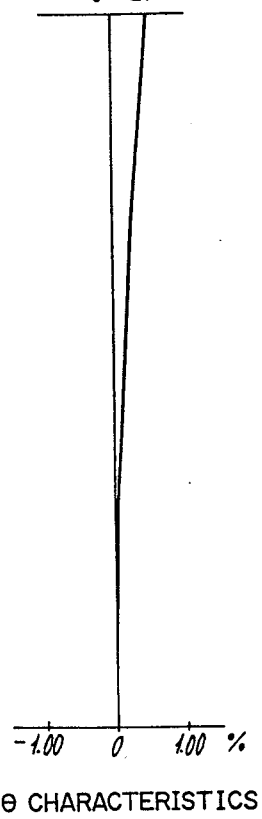
FIGS. 12, 13, 14(a) and 14(b) are diagrams of aberrations explaining Example 2.
Figure 13:
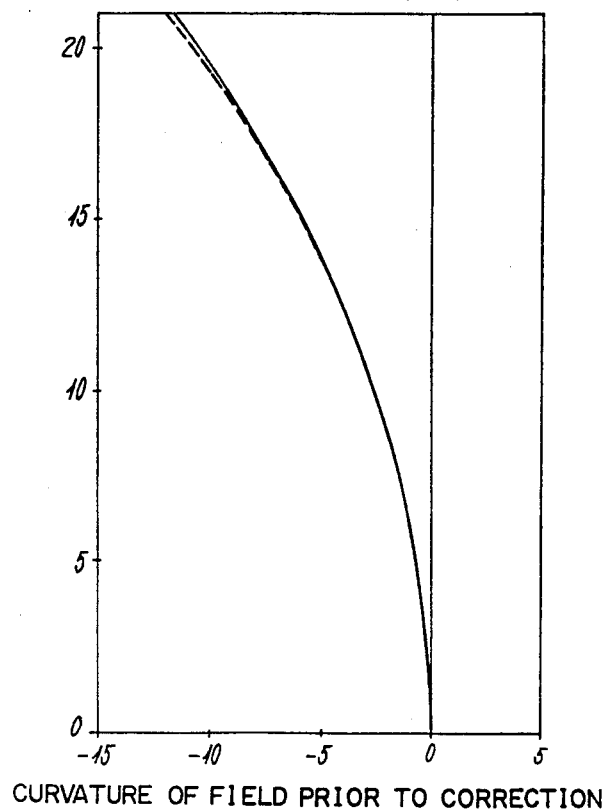
Figure 14:
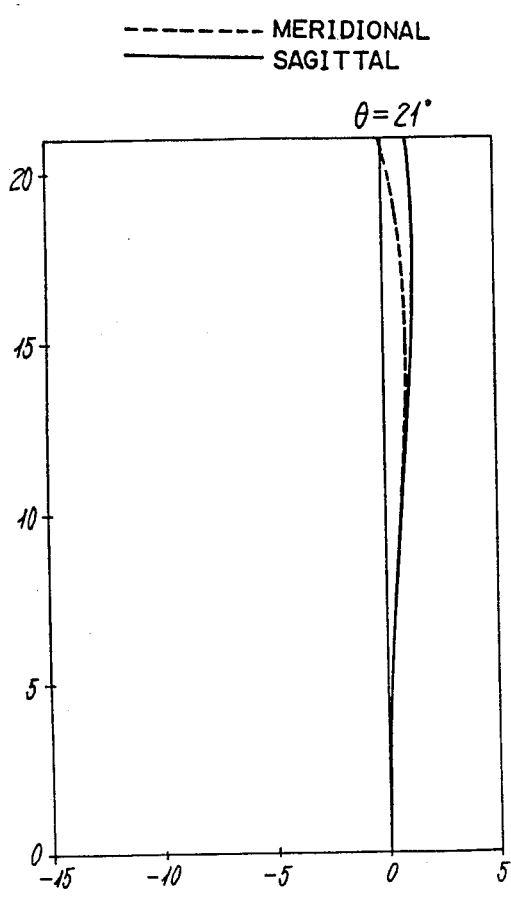
Figure 14:
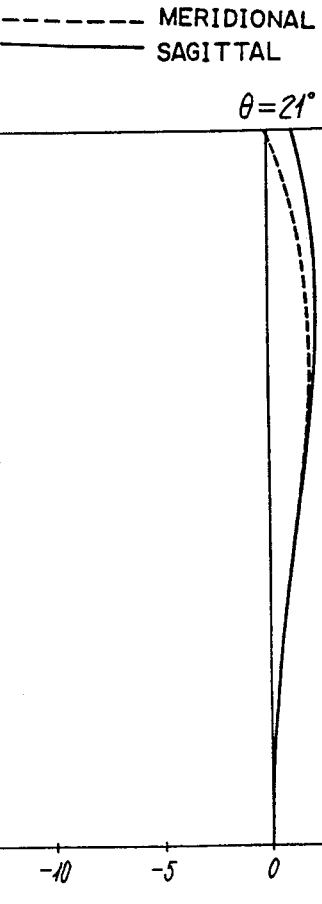
Figure 17:
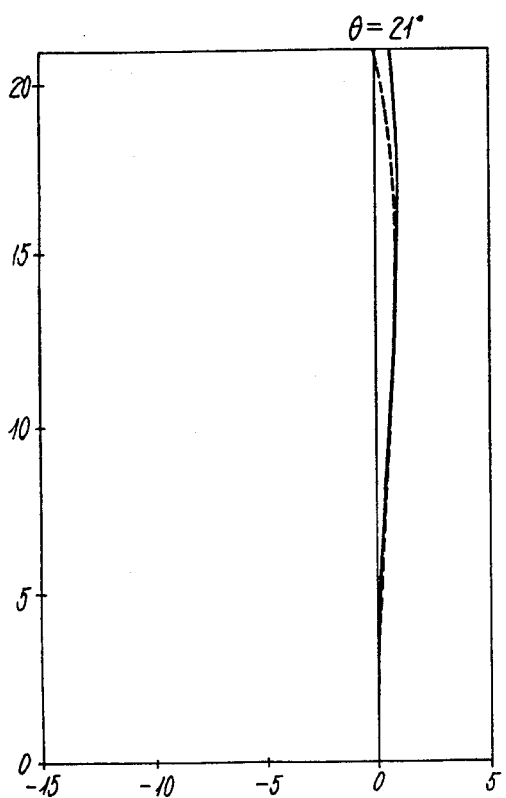
Figure 17:
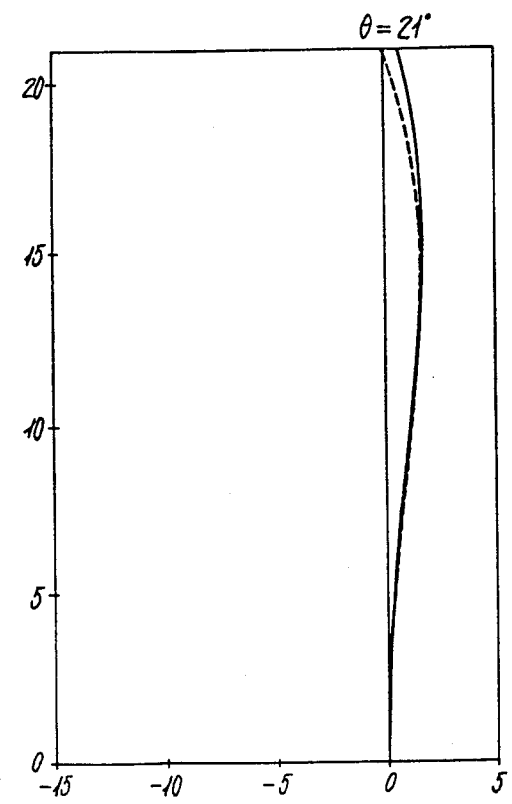
Figure 18:
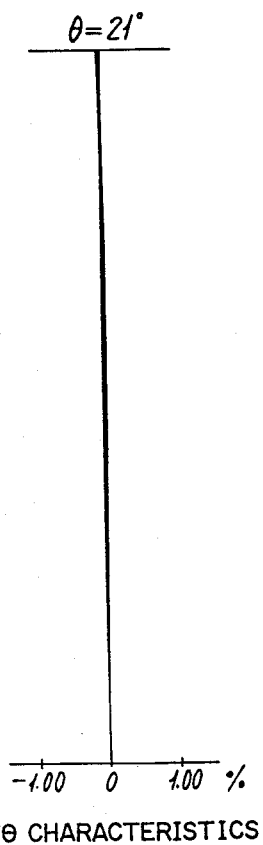
FIGS. 18, 19, 20(a) and 20(b) are diagrams of aberrations explaining Example 4.

FIGS. 12, 13, 14(a) and 14(b) show aberrations of the example 2. FIG. 12 illustrates the $f\theta$ characteristics, FIG. 13 the curvature of field prior to correction, and FIG. 14(a) and 14(b) the curvature of field after correction.

FIGS. 15, 16, 17(a) and 17(b) show aberrations of the example 3. FIG. 15 illustrates the $f\theta$ characteristics, FIG. 16 the curvature of field prior to correction, and FIGS. 17(a) and 17(b) the curvature of field after correction.

Figure 19:
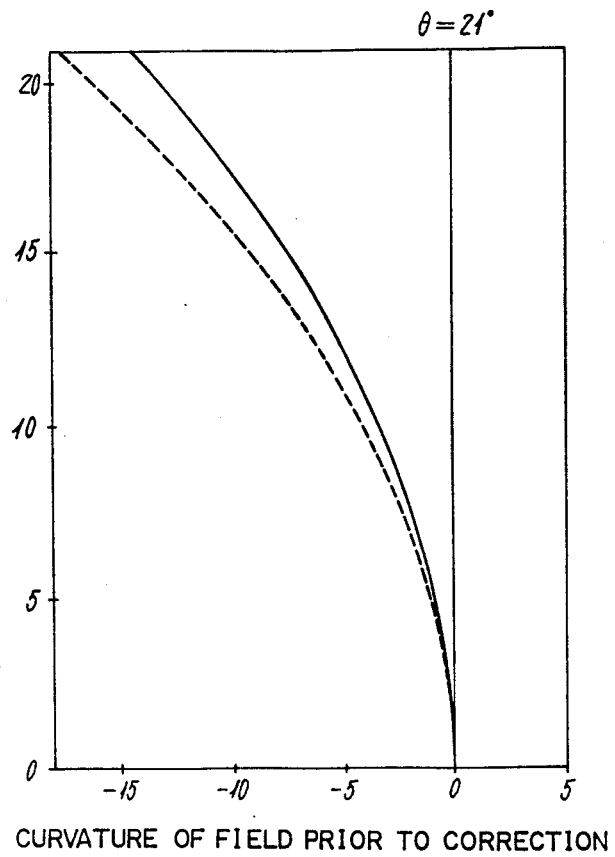
Figure 20:
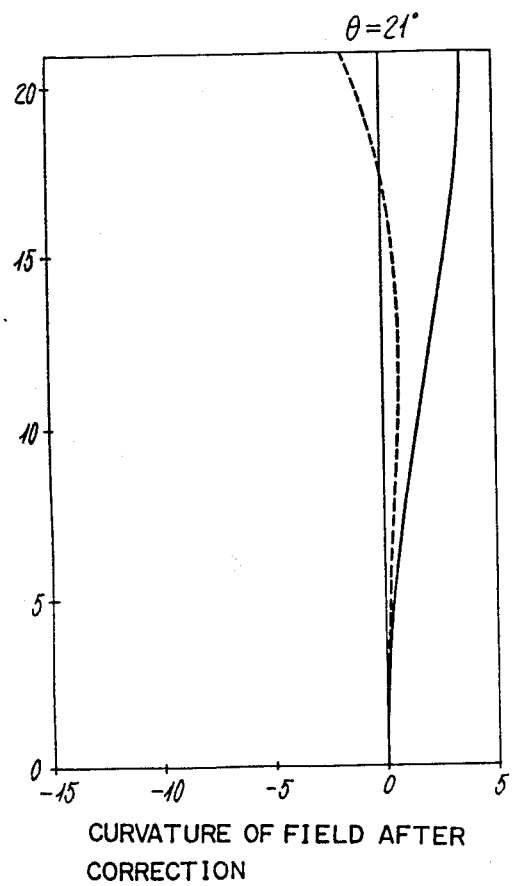
Figure 20:
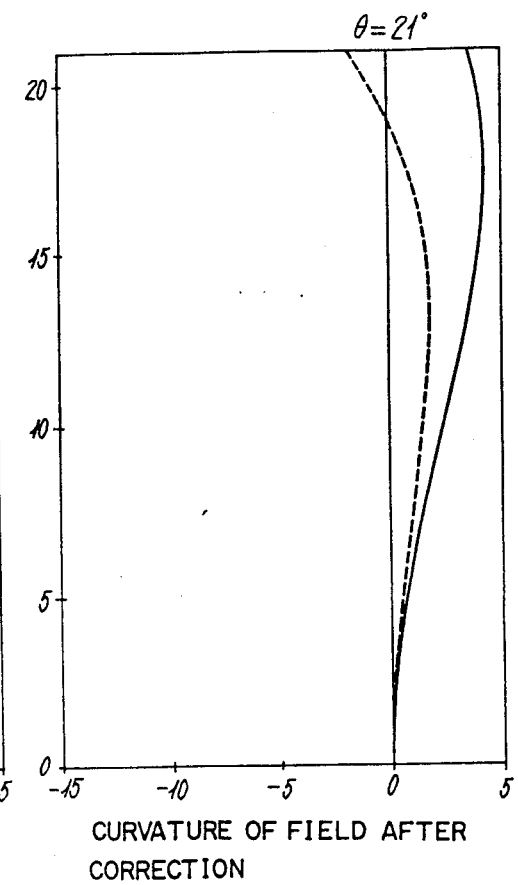

FIGS. 18, 19, 20(a) and 20(b) show aberrations of the example 3. FIG. 19 illustrates the $f\theta$ characteristics, FIG. 19 the curvature of field prior to correction, and FIGS. 20(a) and 20(b) curvature of field after correction.

Four examples in which the LD is vibrated in simple harmonic motion are given in the table 6.

TABLE 6

| | Example 5 | Example 6 | Example 7 | Example 8 |
|---|---|---|---|---|
| $r_1$ | ∞ | −1000 | −1000 | 1000 |
| $r_2$ | −206.5 | −171.861 | −210.792 | −172.444 |
| $L_0$ | 10 | 10 | 10 | 10 |
| n | 1.7 | 1.7 | 1.9 | 1.5 |
| $L_1$ | 169.118 | 162.932 | 148.371 | 194.298 |
| $L_2$ | 69.118 | 36.654 | 36.654 | 36.654 |
| $D_0$ | 11.7 | 11.9 | 10.1 | 17.5 |
| $X_0$ | 0.032 | 0.0324 | 0.0276 | 0.047 |

FIG. 21 and following figures show aberrations of the examples.

Figure 23:
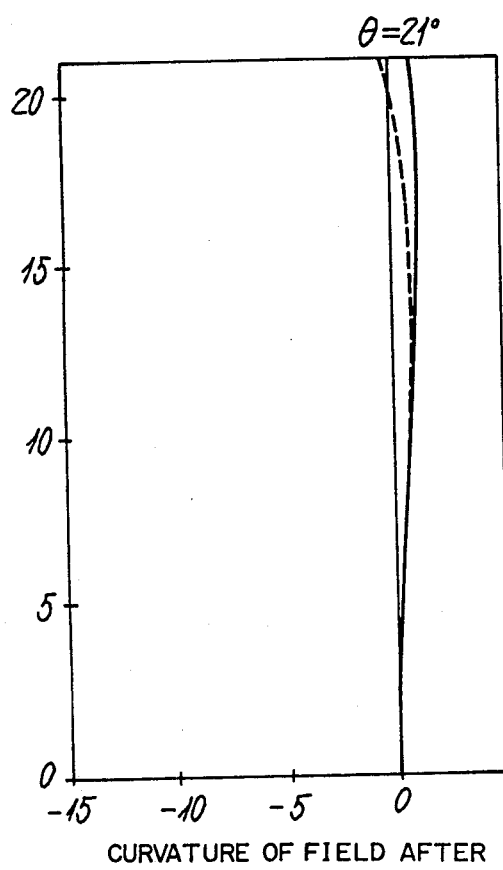
Figure 23:
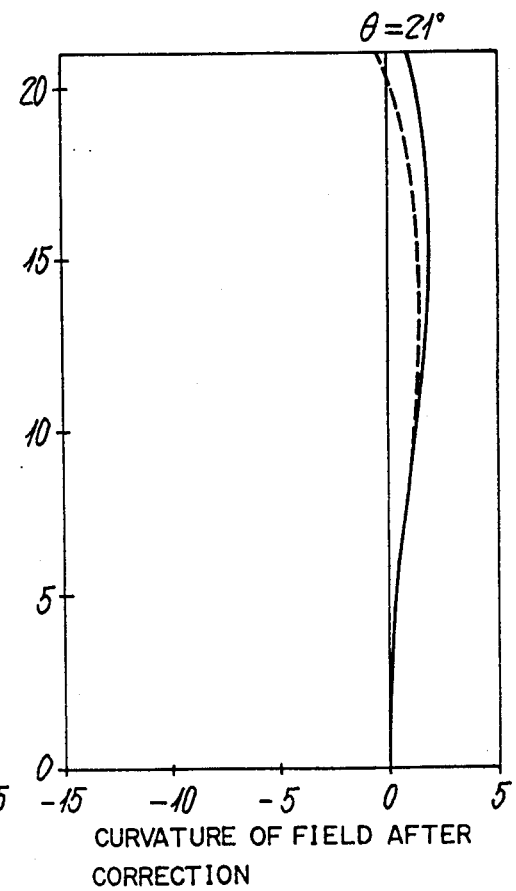

FIGS. 21 shows the $f\theta$ characteristics. The curvature of field prior to correction (no correction is made by simple harmonic motion of the LD) is shown in FIG. 22. The curvature of field after correction is shown in FIGS. 23(A) and 23(B) (FIG. 23(A) show the curvature of field when $E = 0.5$, and FIG. 23(B) shows the curvature of field when $E = 0.7$. The same holds true for the examples 6 through 8).

FIGS. 24 shows the $f\theta$ characteristics of the example 6. The curvature of field prior to correction is shown in FIG. 25. The curvature of field after correction is shown in FIGS. 26(A) and 26(B).

Figure 27:
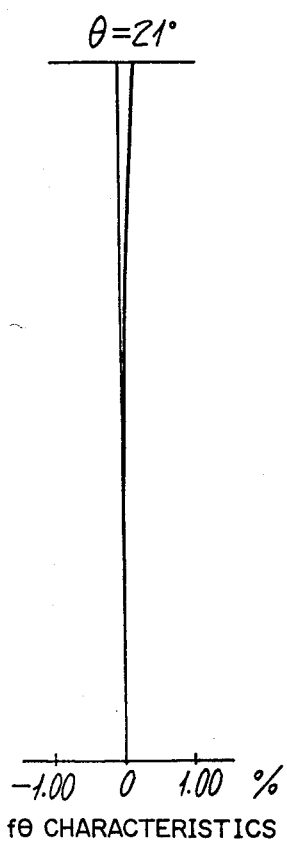
Figure 28:
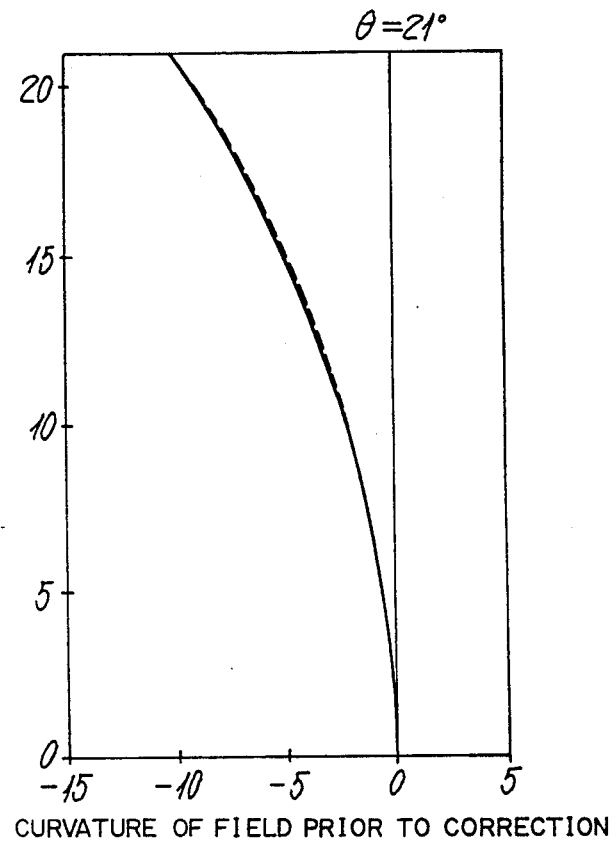

FIGS. 27 shows the $f\theta$ characteristics of the example 7. The curvature of field prior to correction is shown in FIG. 28. The curvature of field after correction is shown in FIGS. 29(A) and 29(B).

FIGS. 30 shows the $f\theta$ characteristics of the example 8. The curvature of field prior to correction is shown in FIG. 31. The curvature of field after correction is shown in FIGS. 32(A) and 32(B).

In the above embodiment, the voice coil motor is employed to vibrate the LD 1 in simple harmonic motion, but a known piezoelectric semiconductor or a precise actuating mechanism known in relation to the control of an objective lens of an optical pickup may also be employed to vibration the LD 1 in simple harmonic motion. The rotating light deflector means may be a pyramidal mirror instead of the rotating polygon mirror. Various other modifications may be made without departing from the scope of the present invention.

What is claimed is:

1. A light scanning method of scanning a surface with a light beam by applying the light beam from a laser beam source through a collimator lens to rotating light deflector means, deflecting the light beam with said light deflector means, and applying the deflected light beam to said surface through an $f\theta$ lens, said method comprising:

making one of said collimator lens and said laser beam source movable in the directions of the optical axis of the collimator lens, and employing as the $f\theta$ lens a single-element lens with $f\theta$ characteristics well corrected; and vibrating a movable one of the collimator lens and the laser beam source in simple harmonic motion in said directions of the optical axis in synchronism with the scanning of the surface with the light beam, for correcting the curvature of field of said $f\theta$ lens.

2. A light scanning method according to claim 1, wherein the collimator lens is vibrated in simple harmonic motion.

3. A light scanning method according to claim 1, wherein the laser beam source is vibrated in simple harmonic motion.

4. A light scanning method according to claim 1, 2, or 3, wherein the laser beam source comprises a laser diode.

* * * * *

UNITED STATES PATENT AND TRADEMARK OFFICE
CERTIFICATE OF CORRECTION

PATENT NO. : 4,906,061

DATED : 3/06/90

INVENTOR(S) : Katsumi Yamaguchi

It is certified that error appears in the above-identified patent and that said Letters Patent is hereby corrected as shown below:

On the title page:

The total number of Drawing Sheets is incorrectly recorded, it should be: --21--

Signed and Sealed this

Thirteenth Day of August, 1991

Attest:

HARRY F. MANBECK, JR.

*Attesting Officer*      *Commissioner of Patents and Trademarks*